United States Patent [19]

Nakamura et al.

[11] Patent Number: 4,694,351

[45] Date of Patent: Sep. 15, 1987

[54] PICTURE SIGNAL PROCESSING APPARATUS

[75] Inventors: Koozoo Nakamura, Hitachiohta; Nagaharu Hamada; Masaharu Tadauchi; Yasuyuki Kozima, all of Hitachi; Noboru Suemori; Takamitu Kouno, both of Yokohama, all of Japan

[73] Assignee: Hitachi, Ltd., Tokyo, Japan

[21] Appl. No.: 863,243

[22] Filed: May 14, 1986

[30] Foreign Application Priority Data

May 15, 1985 [JP] Japan .................................. 60-101301

[51] Int. Cl.⁴ .............................................. H04M 1/00
[52] U.S. Cl. .................................... 358/256; 358/260; 358/282
[58] Field of Search ............... 358/260, 256, 280, 282, 358/261

[56] References Cited

U.S. PATENT DOCUMENTS

4,491,874 1/1985 Yamamoto ........................... 358/260
4,604,653 8/1986 Shimizu ................................ 358/256
4,607,290 8/1986 Murakami ........................... 358/260

Primary Examiner—Edward L. Coles, Sr.
Attorney, Agent, or Firm—Antonelli, Terry & Wands

[57] ABSTRACT

A picture signal processing apparatus comprises a signal processing means for performing signal processing such as picture element density conversion of picture signals, a first memory means for storing temporarily picture signals as object of the signal processing, a first signal path through which signals are received or transmitted between the signal processing means and the first memory means, an encoding means for performing encoding processing, a second memory means for storing temporarily picture signals as object of the encoding processing, a second signal path through which signals are received or transmitted between the encoding means and the second memory means, a control means for controlling the signal processing means and the encoding means, and a third signal path through which signals are received or transmitted between the signal processing means and the encoding means, thereby signal processing and encoding processing can be performed concurrently and high speed processing is realized.

6 Claims, 9 Drawing Figures

PICTURE SIGNAL PROCESSING APPARATUS

BACKGROUND OF THE INVENTION

The present invention relates to apparatuses to encode picture signals in redundancy-reduction encoding system, and more particularly to a picture signal processing apparatus which is suitable for a high-speed facsimile or the like.

In a facsimile in the prior art, an encoding means which converts digital picture signals into redundancy reduction code and performs encoding processing is known well as disclosed in Nakamura et al. "Development of Signal-Chip Facsimile Codec Processor (FCP)", paper No. 1374, presented at 1984 General Meeting of the Institute of Electronics and Communication Engineers of Japan. Also a signal processing means which performs signal processing such as picture element density conversion of digital picture signals is known well as disclosed in "A CMOS Facsimile Video Signal Processor (FVP)", presented at IEEE INTERNATIONAL SOLID STATE CIRCUITS CONFERENCE. However, any system to combine such signal processing means with encoding means and to perform high-speed processing has not been thought.

SUMMARY OF THE INVENTION

An object of the invention is to provide a picture signal processing apparatus which enables high-speed processing in apparatuses such as a facsimile, wherein picture signals obtained by scanning an original document, for example, are subjected to signal processing such as picture element density conversion, and then redundancy reduction encoding processing is performed.

Feature of the invention is in an apparatus which comprises a signal processing means for performing signal processing such as picture element conversion of picture signals, a first memory means for storing temporarily picture signal as object of the signal processing, a first signal path through which signals are received or transmitted between the signal processing means and the first memory means, an encoding means for performing encoding processing, a second memory means for storing temporarily picture signals as object of the encoding processing, a second signal path through which signals are received or transmitted between the encoding means and the second memory means, a control means for controlling the signal processing means and the encoding means, and a third signal path through which signals are received or transmitted between the signal processing means and the encoding means, so that the signal processing and the encoding processing can be performed in parallel and the high-speed processing can be realized.

Other objects and advantages of the invention will be apparent from the following description of the preferred embodiments taken in connection with the accompanying drawings.

DETAILED DESCRIPTION OF THE PREFERRED EMBODIMENTS

An embodiment of the invention will now be described referring to the accompanying drawings.

Figure 1:
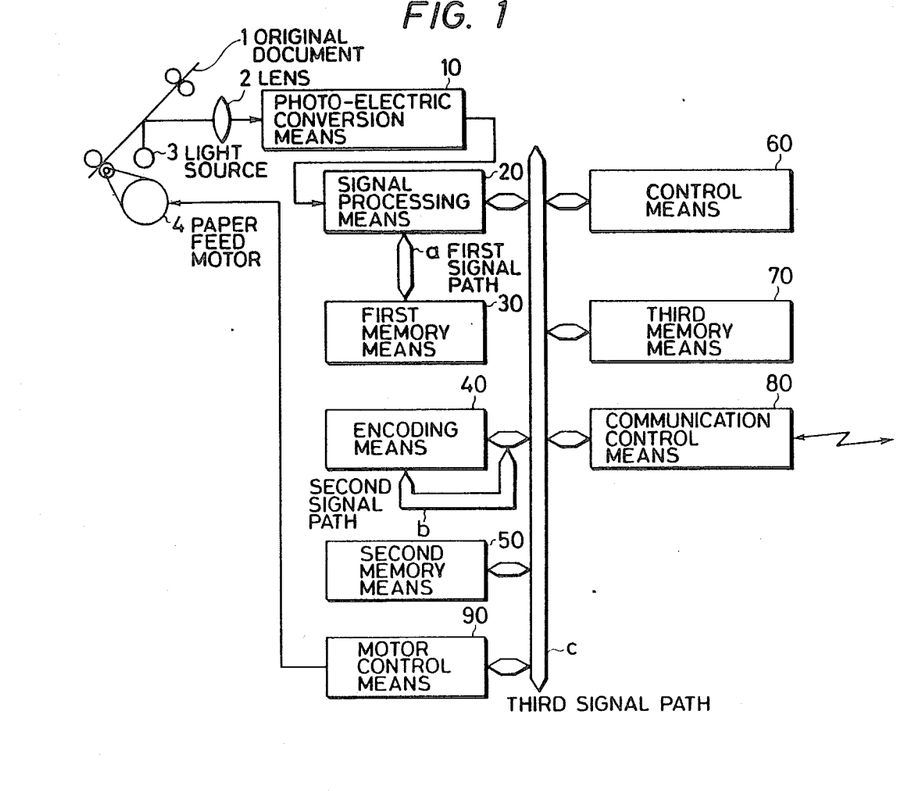
FIG. 1 is a block diagram of a facsimile transmitter as a first embodiment of the invention.

FIG. 1 illustrates a first embodiment of the invention applied to a facsimile. In FIG. 1, reference numeral 1 designates an original document, numeral 2 a lens, numeral 3 a light source such as a fluorescent lamp, numeral 4 a paper feed motor, numeral 10 a photo-electric conversion means for converting optical signals into electric signals, for example, CCD (Charge Coupled Device), numeral 20 a signal processing means which inputs analog picture signals including distortion from the photo-electric conversion means 10 and performs A/D conversion of the inputted signals into first digital picture signals without distortion and performs signal processing such as picture element density conversion, for example, "A CMOS Facsimile Video Signal Processor (FVP)" disclosed in IEEE INTERNATIONAL SOLID-STATE CIRCUITS CONFERENCE in 1985, numeral 30 a first memory means for storing temporarily the first digital picture signals, for example, RAM (Random Access Memory) known in the art, "a" a first signal path through which signals are received or transmitted between the signal processing means 20 and the first memory means 30, numeral 40 an encoding means where redundancy contained in the picture signals after subjected to the signal processing of at least the picture element density conversion by the signal processing means 20 is converted into reduction code and the encoding processing is performed, for example, "High Speed Encoding and Decoding Processor for Group 4 Facsimile Apparatus (FCP)" disclosed in IEEE INTERNATIONAL CONFERENCE ON COMMUNICATIONS in 1984, numeral 50 a second memory means for storing temporarily the digital picture signals as object of the encoding processing, for example, RAM as line buffer memory, "b" a second signal path through which signals are received or transmitted between the encoding means 40 and the second memory means 50, numeral 60 a control means for controlling the facsimile as a whole, such as a micro processor in usual, numeral 70 a third memory means for storing temporarily code produced in encoding processing by the encoding means 40, such as RAM, numeral 80 a communication control means such as modem, numeral 90 a motor control means for outputting drive pulses to the motor 4, and "c" a third signal path through which signals are received or transmitted between the control means 60 and other means. In FIG. 1, the second signal path is coupled to the third signal path.

Next, operation and flow of signals in this embodiment will be described. The optical picture signals obtained by scanning the original document 1 are converted by the photo-electric conversion means 10 into analog electric picture signals (hereinafter referred to as "analog picture signals") at least in one scanning line unit. And then the analog picture signals are converted by the signal processing means 20 into digital picture signals without shading distortion or the like (Picture signals in hereinafter description shall mean "digital picture signals".). When the picture element density conversion, for example, conversion of line density in subsidiary scanning direction from 7.7 line/mm into 38.5 line/mm, is performed in logical operation to picture signals of scanning lines after scanned already, the signal processing means 20 writes picture signals through the first signal path "a" to the first memory means 30 and at the same time reads picture signals stored in the first memory 30 and for scanning lines after scanned already, so as to perform logical operation to picture signals of existing scanning line and the picture element density conversion. Picture signals at least subjected to the picture element density conversion are outputted to the third signal path "c". The picture signals are written to the second memory means 50 according to DMA (Direct Memory Access) transfer function of the encoding means 40.

Then exchange of the signal path occupation is performed between the encoding means 40 and the control means 60 so that address signal and control signal of the third signal path "c" are exchanged to address signal and control signal of the second signal path "b". That is, picture signals from the signal processing means 20 is inputted as data signals of the third signal path "c" into the second memory means 50, and written to the second memory means 50 by address signal and control signal both supplied from the encoding means 40 to the second memory means 50 through the second signal path "b". The encoding means 40 reads picture signals from the second memory means 50 through the second signal path "b" and the third signal path "c", and performs encoding processing, for example, by MH (Modified Huffman) code being international standard code of facsimile and outputs the code to the third signal path "c". The code is buffered to the third memory means 70 by the control means 60, and then outputted and transmitted to communication network such as telephone network.

Figure 2:
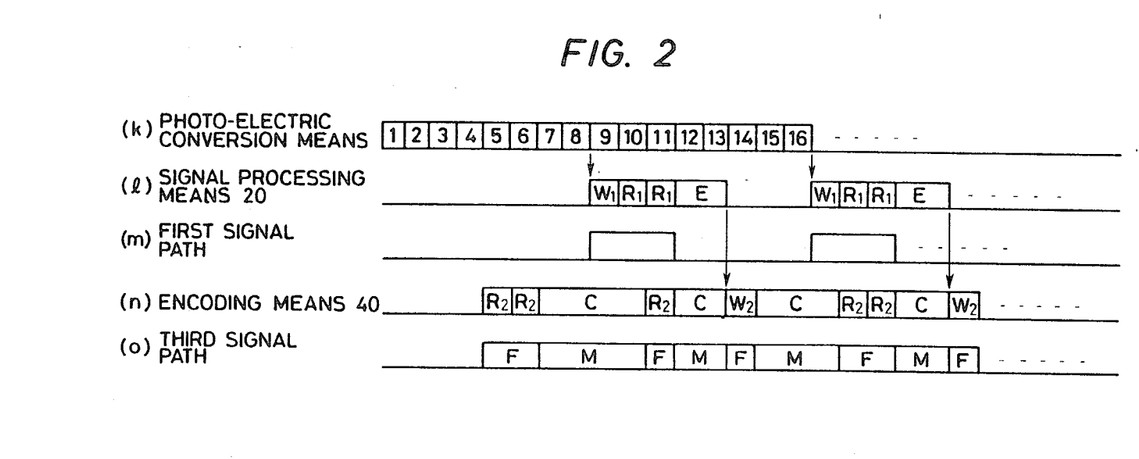
FIG. 2 is a timing chart of the system shown in FIG. 1.

Timing of the processing will be described referring to FIG. 2.

(k) represents output timing of analog picture signals of the photo-electric conversion means 10, and is bit serial.

(l) represents operation timing of the signal processing means 20. For example, picture signals with each word composed of eight bits are written to the first memory means 30 ($W_1$), picture signals on the previous scanning line and on the scanning line being two lines before the present scanning line are read from the memory means 30 ($R_1$), logical operation is performed using picture signals on the present scanning line and on the previous scanning line and on the scanning line being two lines before the present scanning line and picture element density conversion is performed (E), and the picture signals after the conversion are outputted to the signal path "c".

(m) represents timing of the first signal path "a", and is used during period at $W_1$ and $R_1$.

(n) represents operation timing of the encoding means 40. $R_2$ represents timing that picture signals are read in word unit from the second memory means, C represents timing of encoding processing, and $W_2$ represents timing that picture signals from the signal processing means 20 are written in the second memory means 50.

(o) represents use state of the third signal path "c". F represents timing of the encoding means 40 used for sccess of the second memory means 50, and M represents timing that the control means 60 can use the third signal path "c" for control of the system as a whole.

In this constitution, since the signal processing means 20 and the encoding means and also the signal processing means 20 and the control means 60 can be used in parallel, the complicated signal processing can be executed without deteriorating performance in the encoding processing.

Figure 3:
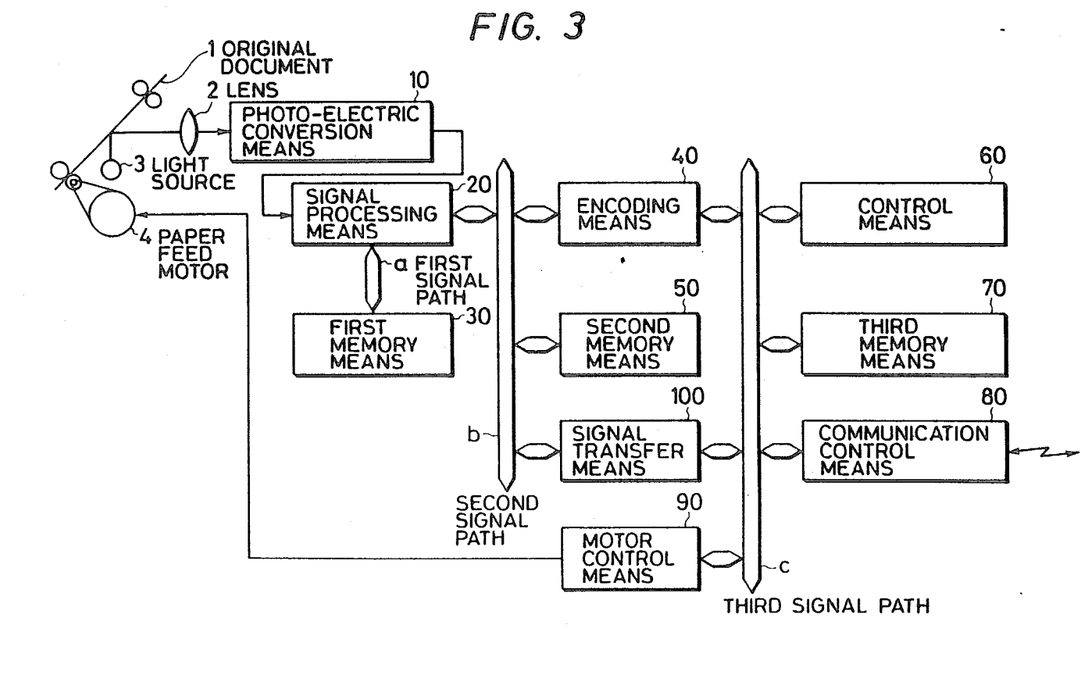
FIG. 3 is a block diagram of a facsimile transmitter as a second embodiment of the invention.

FIG. 3 shows a second embodiment of the invention applied to a facsimile. The second signal path "b" and the third signal path "c" in the preceding embodiment of FIG. 1 are separated, and the signal processing means 20 is connected to the second signal path "b".

In FIG. 3, numeral 100 designates a signal transfer means which performs signal transmission/receiving between the second signal path "b" and the third signal path "c".

Next, operation and flow of signals in the second embodiment will be described. The optical picture signals obtained by scanning the original document 1 are converted by the photo-electric conversion means 10 into analog picture signals. And then the analog picture signals are converted by the signal processing means 20 into digital picture signals and stored in the first memory means 30. Picture signals subjected to signal processing such as picture element density conversion by the signal processing means 20 pass through the second signal path "b" and are written in the second memory means 50. The encoding means 40 reads the picture signals from the second memory means 50 and performs encoding processing, and outputs the code to the third signal path "c". The code passes through the third signal path "c" and is stored in the third memory means 70. The code is read from the third memory means 70, and outputted by the communication control means 80 to the communication network. Control information from the control means 60 to the signal processing means 20 is transmitted by the signal transfer means 100 through the third signal path "c" and the second signal path "b". Then the control means 60 releases the right for the encoding means 40 to use the second signal path "b" so that signals from the signal transfer means 100 flow to the second signal path "b".

Timing of the processing will be described referring to FIG. 4. Timing from (k) to (n) is similar to FIG. 2.

Figure 4:
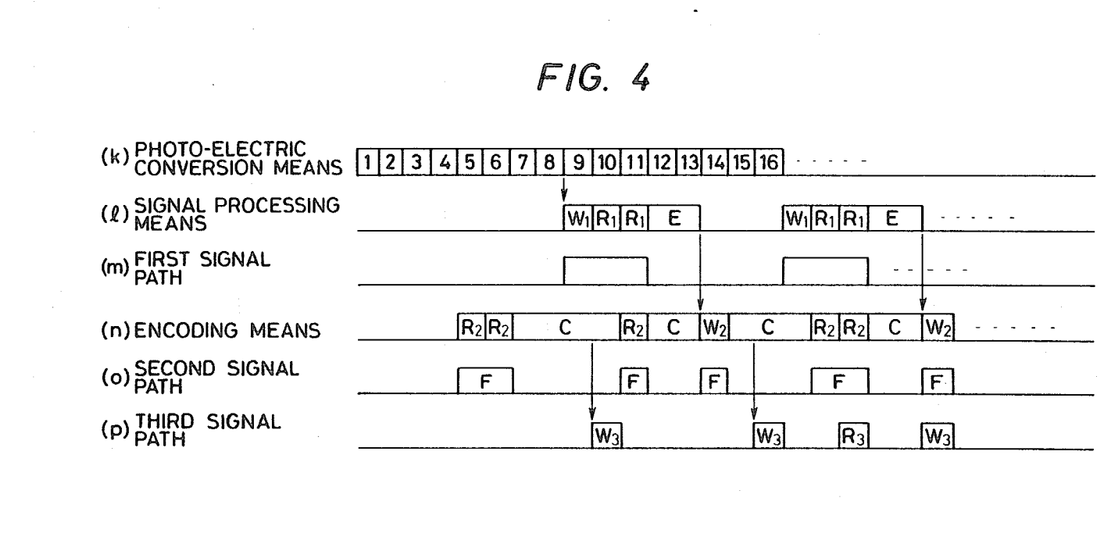
FIG. 4 is a timing chart of the system in FIG. 3.

In FIG. 4, (o) represents use state of the second memory means 50.

(p) represents use state of the signal path "c". $W_3$ represents timing that code from the encoding means 40 is written in the memory means 70, and $R_3$ represents timing that code is read from the third memory 70 to the communication control means 80. In (p), during period other than $W_3$ and $R_3$, the control means 60 may be freely used for control of the system as a whole. In this constitution, the signal processing means 20 and the encoding means 40 and the control means 60 can be operated in parallel, the signal encoding processing can be performed at high speed.

Figure 5:
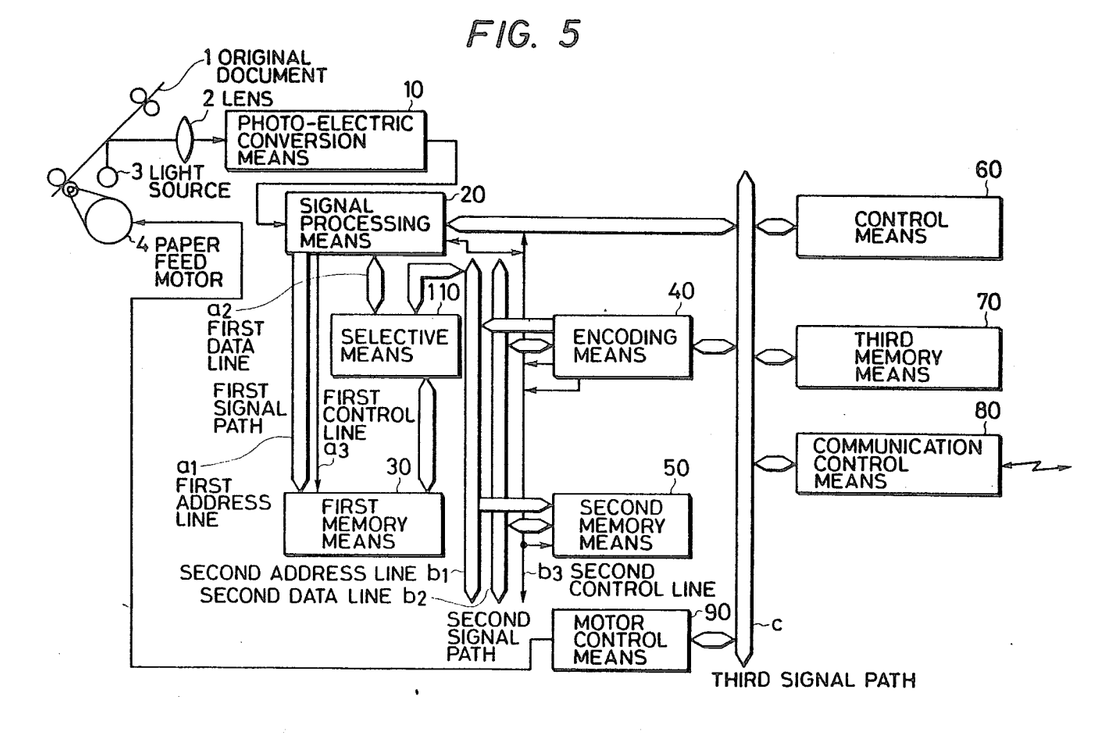
FIG. 5 is a block diagram of a facsimile transmitter as a third embodiment of the invention.

FIG. 5 shows a third embodiment of the invention applied to a facsimile. The signal processing means 20 in FIG. 3 is connected to the third signal path "c", and a selective means 110 is installed so that either first data line $a_2$ of the first signal path "a" or second data line $b_2$ of the second signal path "b" is selected and data line of the first memory 30 is connected.

Next, operation and flow os signals in the third embodiment will be described.

The optical picture signals obtained by scanning the original document 1 are converted by the photo-electric conversion means 10 into analog picture signals. And then the analog picture signals are converted by the signal processing means 20 into digital picture signals and stored in the memory means 30. Picture signals subjected to signal processing such as picture element conversion by the signal processing means 20 are written in the first memory means 30. Then the selective means 110 selects the first data line $a_2$. If picture signals after the signal processing are stored by that corresponding to one scanning line into the first memory means 30, the selective means 110 selects the second data line $b_2$. The signal processing means 20 outputs the first address line $a_1$ where the picture signals after the signal processing are stored, and reads the first control line $a_3$. The encoding means 40 outputs the second address line $b_1$ to the second memory means 50, and writes the second control line $b_3$, thereby picture signals are directly transferred from the first memory means 30 to the second memory means 50. The encoding means 40 reads the picture signals from the second memory means 50 and performs encoding processing, and outputs the code to the third signal path "c". The code passes through the third signal path "c" and is stored in the third memory means 70. The code is read from the third memory means 70, and outputted by the communication control means 80 to the communication network. The control means 60 transmits control signals to the signal processing means 20 and the encoding means 40 using the third signal path "c", and controls the signal processing means 20 and the encoding means 40.

Figure 6:
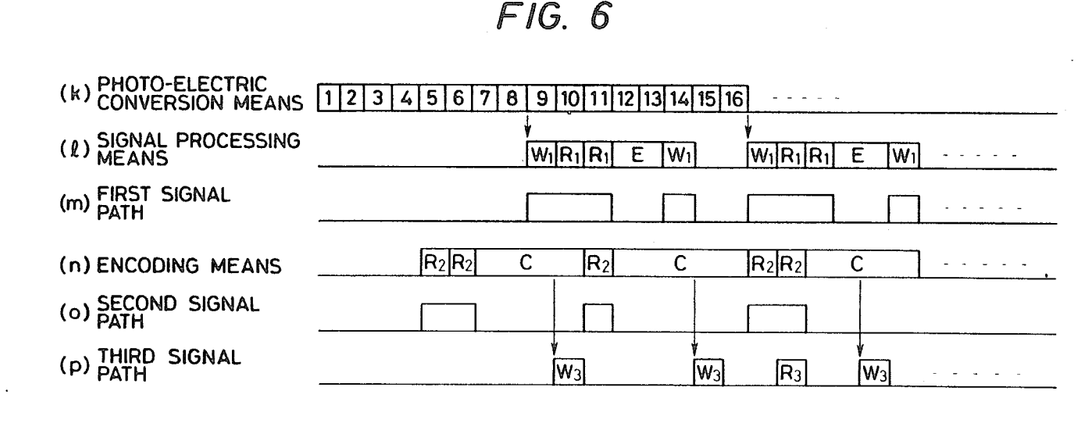
FIGS. 6 and 7 are timing charts of the system in FIG. 5.

FIG. 6 shows timing that the selective means 110 selects the first data line $a_2$.

In FIG. 6, (1) represents operation timing of the signal processing means 20. Picture signals after the signal processing E are written in the first memory means 30. (n) represents operation timing of the encoding means 40. This is different from the timing chart of FIG. 4 in that there is no transfer $W_2$ of picture signals in word unit from the first memory means 30 to the second memory means 50.

Figure 7:
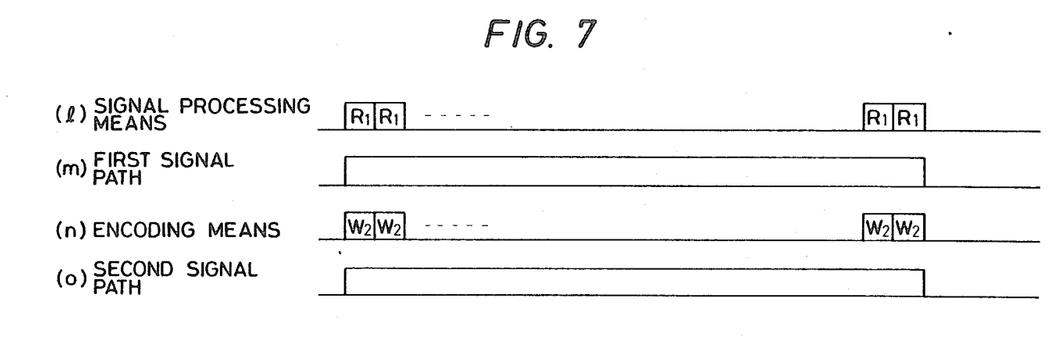

FIG. 7 shows timing that the selective means 110 selects the second data line $b_2$ and data transfer is performed from the first memory means 30 to the second memory means 50.

In FIG. 7, (1) represents timing that the signal processing means 20 reads picture signals from the first memory means 30 using the first address line $a_1$ and the first control line $a_3$ to the first memory means 30. (n) represents timing that the encoding means 40 writes picture signals from the first memory means 30 into the second control means 50 using the second address line $b_1$ and the second control line $b_3$. The data transfer is performed, for example, by collecting data corresponding to one scanning line in one block.

In constitution as shown in FIG. 5, since transfer of picture signals from the first memory means 30 to the second memory means 50 can be performed in collecting state in one block, the changing time between the encoding processing performed in word unit and the data transfer processing becomes unnecessary and the data transfer can be performed at high speed. Since picture signals from the first memory means 30 are not latched by the signal processing means 20 but can be transferred directly to the second memory means 50, the transfer is performed at high speed. Furthermore, since control signal from the control means 60 can be transmitted directly to the signal processing means 20, the control is performed easily at high speed.

Figure 8:
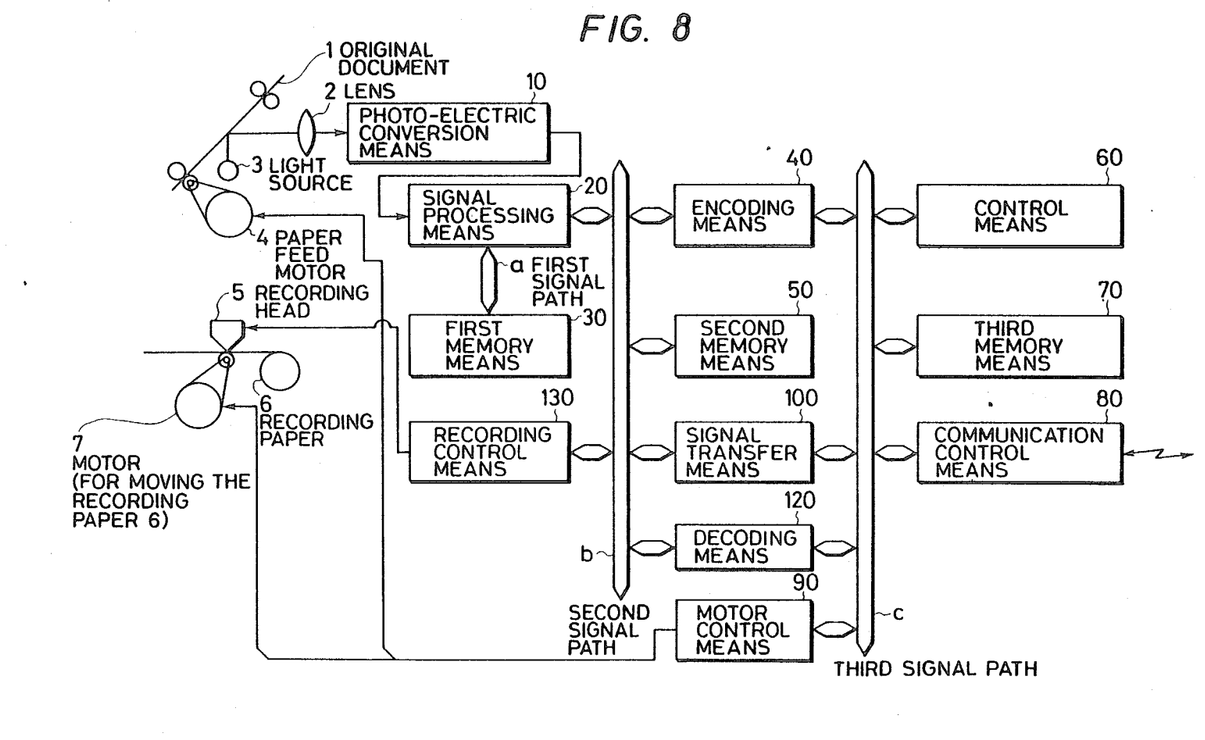
FIG. 8 is a block diagram illustrating application of the invention to a facsimile transmitter/receiver.

FIG. 8 shows another embodiment of the invention applied to a facsimile transmitter/receiver. In FIG. 8, numeral 5 designates a recording head such as a heat-sensitive recording head, numeral 6 a recording paper, numeral 7 a motor for moving the recording paper 7 in subsidiary scanning direction, numeral 120 a decoding means such as FCP, and numeral 130 a recording control means for controlling the recording head 5 and performing the printing.

Next, operation of the embodiment at receiving state will be described. Transmission signals fed from the transmitter are demodulated by the communication control means 80, and stored temporarily as code in the third memory means 70. The decoding means 120 inputs the code from the third memory means 70 and restores it to original picture signals and writes the picture signals in the second memory means 50. The picture signals restored as above described are transferred from the memory means 50 to the recording control means 130. The recording control means 130 transfers the picture signals to the recording head 5 for recording in the recording head 5. After finishing the recording corresponding to one scanning line, the control means 60 issues the drive command of the recording motor to the motor control means 90. The motor drive means 90 drives the recording motor 7 and executes the subsidiary scanning.

Figure 9:
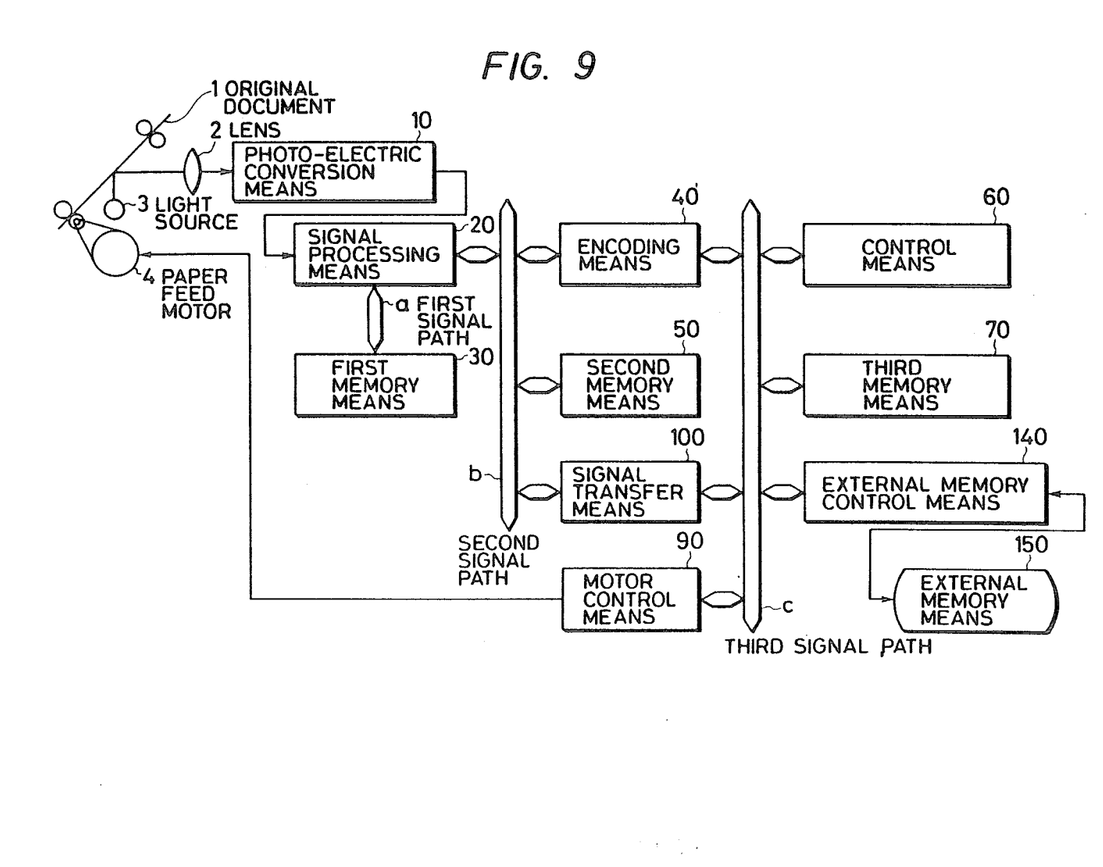
FIG. 9 is a block diagram illustrating application of the invention to an electronic file apparatus.

FIG. 9 shows another embodiment of the invention applied to an electronic file apparatus. In FIG. 9, numeral 140 designates an external memory control means, and numeral 150 an external memory means, such as a floppy disc, a magnetic tape, a hard disc, an optical disc or the like.

Next, operation of the embodiment will be described. Code encodes by the encoding means 40 is stored temporarily in the memory means 70, andthen transferred to the external memory means 140. The external memory control means 140 stores the code in the external memory means 150.

According to the invention, since the signal processing such as picture element density conversion of the picture signals and the encoding processing of the picture signals after the signal processing can be performed concurrently, the picture processing can be performed at high speed.

What is claimed is:

1. A picture signal processing apparatus wherein digital picture signals are encoded in redundancy reduction encoding system, said apparatus comprising:

a signal processing means for performing signal processing at least picture element density conversion of picture signals;

an encoding means for inputting the digital picture signals processed by the signal processing means and performing encoding processing at least conversion of the signals into redundancy reduction code;

a first memory means for storing temporarily the digital picture signals so that the signal processing means performs the picture element density conversion;

a first signal path through which signals are received or transmitted between the signal processing means and the first memory means;

a second memory means for storing temporarily the digital picture signals so that the encoding means performs the encoding processing;

a second signal path through which signals are received or transmitted between the encoding means and the second memory means;

a third memory means for storing temporarily the code encoded by the encoding means;

a third signal path through which signals are received or transmitted between the encoding means and the third memory means; and a control means connected to the third signal path for controlling processing of at least the signal processing means and the encoding means through at least the third signal path.

2. A picture signal processing apparatus as set forth in claim 1, wherein the second signal path and the third signal path are coupled and signals are received or transmitted between the control means, the signal processing means and the encoding means through the third signal path; the digital picture signals outputted from the signal processing means are transferred through the third signal path to the second memory means; and the control means accesses the third memory means through the third signal path.

3. A picture signal processing apparatus as set forth in claim 1, wherein a signal transfer means is provided so that signal are received or transmitted between the control means and the signal processing means; signals are received or transmitted between the control means and the signal processing means through the second signal path, the signal transfer means and the third signal path; and the digital picture signals outputted from the signal processing means are transferred through the second signal path to the second memory means.

4. A picture signal processing apparatus as set forth in claim 1, wherein a signal path selective means is provided so that either the first signal path or the third signal path is selected and connected to the first memory means; and signals are received or transmitted between the first memory means and the second memory means without passing through the signal processing means.

5. A picture signal processing apparatus as set forth in claim 1, wherein signals are received or transmitted between the control means and the signal processing means through the third signal path; a signal path selective means is provided so that the first signal path or the second signal path is selected and connected to the first memory means; and signals are received or transmitted between the first memory means and the second memory means without passing through the signal processing means.

6. A picture signal processing apparatus as set forth in claim 5, said apparatus comprising a signal path selective means for selecting a data signal path of the first signal path and the second signal path and connecting it to the first memory means, wherein the data signal path of the second signal path is connected to the first memory means, the first address signal and the second control signal are supplied from the signal processing means through the first signal path to the first memory means, the second address signal and the second control signal are supplied from the encoding means through the second signal path to the second memory means, thereby signals are received or transmitted between the first memory means and the second memory means.

* * * * *